June 4, 1935. I. T. HOOK 2,003,488
THREADLESS PIPE CONNECTION AND METHOD OF MAKING SAME
Filed June 6, 1932
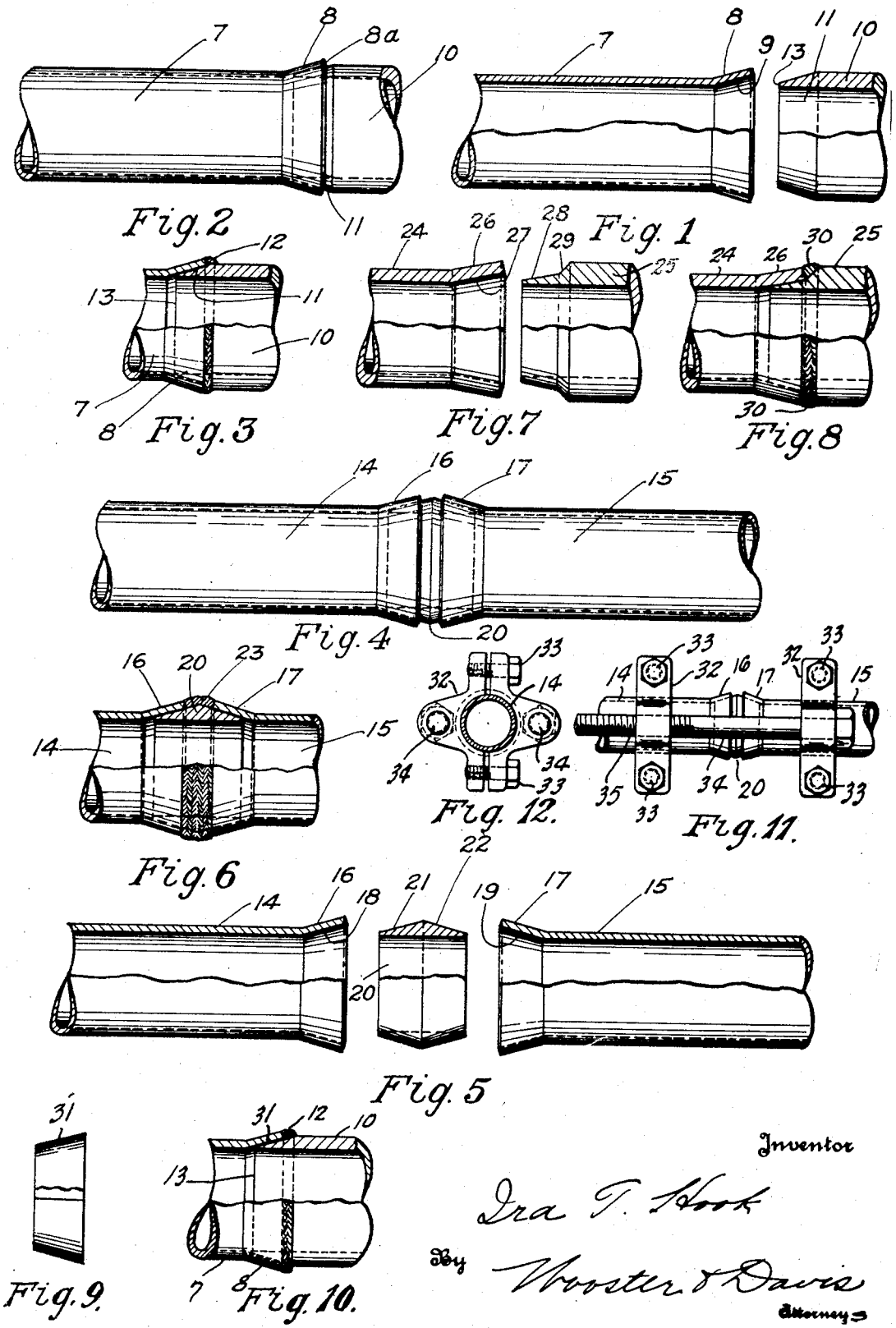

Patented June 4, 1935

2,003,488

UNITED STATES PATENT OFFICE 2,003,488

THREADLESS PIPE CONNECTION AND METHOD OF MAKING SAME

Ira T. Hook, New Haven, Conn., assignor to The American Brass Company, Waterbury, Conn., a corporation of Connecticut Application June 6, 1932, Serial No. 615,661

6 Claims. (Cl. 29—148.2)

This invention relates to new and useful improvements in threadless pipe connections, and has for an object to provide a threadless pipe connection which is simple, strong and durable, and which may be put together or assembled by those not highly skilled in the art of welding or soldering.

Another object of the invention is to provide a joint in which the full strength of the pipe wall may be developed and it will therefore not be necessary to increase the thickness of the pipe walls beyond that necessary to hold the pressure used and to compensate for corrosion. This connection may be termed a tapered weld.

A further object is to provide an improved method of assembling or forming a threadless pipe joint, the said method insuring continuity of the weld metal film between the adjacent surfaces of the parts being joined.

Other objects and advantages will become apparent from a consideration of the following detailed description taken in connection with the accompanying drawing wherein satisfactory embodiments of the invention are shown. However, it will be understood that the invention is not limited to the details disclosed but includes all such variations and modifications as fall within the spirit of the invention and the scope of the appended claims.

In the drawing:

Fig. 1 is a view partly in side elevation and partly in section and showing an end portion of a pipe and an end portion of a fitting according to the present invention;

Fig. 2 is a side elevational view showing the end portions of the pipe and fitting telescoped;

Fig. 3 is a view partly in section and partly in side elevation and showing the completed joint;

Fig. 4 is a side elevational view of a line connection according to the present invention and before the weld metal is applied;

Fig. 5 is a view partly in side elevation and partly in section and showing the parts or elements of Fig. 4 before assembly;

Fig. 6 is a view partly in section and partly in side elevation and showing a completed line connection according to the present invention;

Fig. 7 is a view similar to Fig. 1 showing a thick wall pipe and a fitting for use therewith;

Fig. 8 is a partial side elevation and partial section showing the completed joint using the members of Fig. 7;

Fig. 9 is a partial side elevation and partial section of a truncated cone of bonding material which may be used in forming the joint;

Fig. 10 is a partial side elevation and partial section of a joint showing the use of the element of Fig. 9;

Fig. 11 is a side elevation of a pipe and connection showing a device for pressing the ends together during the soldering or welding operation; and Fig. 12 is a view looking from the left of Fig. 11.

It is well known that the pipe used for many years in what is known to the trade as the standard iron pipe sizes has unnecessarily thick walls for its entire length due to the fact that such thick walls are needed at each end of a piece of pipe to carry the thread. The real strength of the pipe is that corresponding to the thickness of the metal or pipe wall at the bottoms of the threads. There is, therefore, a considerable waste of material in pipes, the walls of which are of unnecessary thickness and this waste is particularly expensive in brass or copper piping. For some time past there has been a demand for a pipe connection which would enable the user to employ a pipe having only the wall thickness necessary to carry the pressure required and to compensate for the usual corrosion with a reasonable factor of safety. In the accompanying drawing is illustrated a threadless pipe joint such as will meet the present demand and which does not require exceptional skill for its use.

Referring in detail to the drawing, and first to Figs. 1, 2 and 3 thereof, at 7 is shown a portion of a section of a thin walled pipe, which pipe may be iron, brass, copper, copper alloys, or other metal. The end portion 8 of the pipe 7 is expanded as shown to provide an internally tapered surface 9, the purpose of which will presently appear. This end 8 of the pipe may be expanded simply by driving a tapered plug into the same or by using a roller device such as is used in expanding of boiler tubes.

At 10 is shown a portion of a fitting which may be an elbow, a T, a Y, a valve body, or the like and this fitting which has relatively thick walls as shown and which may be in the form of a forging, casting or the like, has its end portion 11 machined to provide an external taper as shown. The taper of the end portion 11 of the fitting 10 is preferably an exact counter-part of the inner tapered surface or cone surface 9 of the pipe 7. The angle of the taper may vary considerably, but I have found an included angle of approximately 21° is very satisfactory.

When the pipe 7 and fitting 10 are to be connected the tapered end 11 of the fitting is inserted in the expanded end portion of the pipe and solder or weld metal applied. While the joint is being heated the solder or weld metal will run into the joint and form a strong thin film between the adjacent surfaces of the pipe and fitting and serve to weld these surfaces together. While the solder or weld metal is in molten condition the pipe and fitting may be pressed tightly toward one another whereby to spread the solder or weld metal between the adjacent surfaces and thus insure continuity of the solder or weld metal film. Any suitable means may be provided for so pressing the elements together. In Figs 11 and 12 I have shown split clamps 32 which may be clamped about the elements as by screws 33 and connected by adjusting screws 34 having threaded connection with one of the clamps as indicated at 35. It will be evident that by adjusting these screws the elements being connected may be tightly pressed together at the joint. If the tapered surfaces are on the same taper they will fit tightly giving a very strong connection. It is well known that the strength of the joint is dependent largely upon how close together the soldered surfaces are, or in other words the thickness of the solder film. In general the thinner the solder or weld metal film, providing it is continuous, the stronger the connection.

It is preferred not to cut away the material of the end of the fitting to form a thin fin or feather edge since such thin portion of the fitting would be easily damaged in handling and it would be impractical from the standpoint of the fitting manufacturer who does the machining. Therefore the end 13 is left with sufficient thickness to have the required strength. When the pipe and fitting are telescoped and in the soldering or sweating operation the shoulder 8a is concealed by a ring of solder or weld metal 12 connecting the shoulder and the exposed portion of the tapered end 11 of the fitting, the said ring being substantially wedge shaped in cross section as shown in Fig. 3 whereby the completed joint has a finished appearance.

In Figs. 4, 5 and 6 the invention is illustrated as a line connection. In these figures pipe sections 14 and 15 have their end portions 16 and 17 respectively, expanded as above described to provide the respective pipe sections with internal tapered surfaces 18 and 19. A fitting 20 in the shape of a coupling ring is used to connect the expanded end portions 16 and 17 of the pipes and the outer surface of the said fitting ring 20 inclines upwardly toward its center from its ends to provide oppositely arranged tapered surfaces 21 and 22.

Coupling ring 20 is preferably relatively heavy, and has its surfaces 21 and 22 machined so that they are exact counter-parts of the tapered surfaces 18 and 19 respectively of the pipes. When connecting the pipes 14 and 15 the ring 20 may have one of its end portions inserted into the expanded end of one pipe and the expanded end of the other pipe may then be telescoped over the second end portion of the fitting or coupling ring.

When the tapered surfaces are placed together, fluxed and solder or weld metal is applied and the joint heated as by a suitable torch this solder will run into the joint and form a film between the adjacent surfaces of the fitting or ring and pipes and serve to weld or bond said surfaces. Both pipes are welded to the fitting or ring at the same time and by pressing the pipes toward one another as indicated in Fig. 11 the molten solder or weld metal between the tapered surfaces of the pipes and the tapered surfaces of the ring will be spread or distributed in a manner to insure continuity of the solder film. As here shown the tapers of the engaging surfaces of the joint are such that the extreme ends of the expanded portions of the pipe remain spaced apart forming a convenient entrance for the solder or weld metal. The joint may be further strengthened and completed by filling the space between the extreme ends of the adjacent expanded portions of the pipes with solder or weld metal as at 23.

In Figs. 7 and 8 is shown how the joint is preferably formed when the walls of the pipe and the attached fitting are of considerable thickness. Here the wall of the pipe 24 is shown as of considerably greater thickness than that of the other figures, and also the wall of fitting 25 is of greater thickness. The end 26 of the pipe is expanded to provide the taper 27 the same as in the other forms and the end of the fitting is turned down to form a corresponding taper 28 to fit the taper 27. As the walls of the fitting are of considerable thickness a shoulder 29 may be formed at the larger end of the taper. This shoulder is also preferably tapered, the angle preferred being at about 45° to the axis of the pipe. This makes a tapered recess when the parts are placed together to form the joint which may be filled with the solder or other weld metal 30 as shown in Fig. 8.

When forming the joints as above described heat may be applied to the joints as with a gasoline or acetylene torch and in this operation if an acetylene torch is used on the relatively thin walled tubing care should be taken that the tubing is not overheated and that holes are not burnt in it. If desired, the soldering metal used may be the usual soft solder, such as the lead-tin solder, the cadmium-zinc solder, tin-antimony, or the silver solder group, or a brazing metal such as Muntz metal, Tobin bronze, manganese bronze, spelter solder, etc., or any other metal which will melt at a temperature lower than the melting point of the pipe and fitting material. It is preferred that a soft solder be used only in the making of temporary connections and that a brazing metal such as Tobin bronze or the like, be used for permanent installations or where the pipe is to carry hot water or steam.

The welding material such as Tobin bronze, or the other metals or alloys, may be applied as a pre-formed cone as shown at 31 in Figs. 9 and 10 placed between the expanded end of a pipe and a tapered surface of a fitting in which case the connection is "sweated" together. This truncated cone may be formed of sheet metal or in other ways desirable, and is placed between the expanded end of the pipe and the externally tapered end of the other member while all of the metals are cold, and the connection then heated to the melting point of the solder or weld metal and the members pressed together. Or the surfaces intended to be bonded can be coated with the bonding metal by dipping them in a melted bath of this metal previous to assembly and then the parts heated and pressed together in the manner described. Also, the bonding material can be applied as a welding rod as is usually done in welds on steel. It has been found that a slim taper is desirable if a "sweated" connection is to be made in order that a long coverage will be obtained with a minimum expansion. A wide taper is desirable for larger diameters and thicker walls in order that in a line connection sufficient wall thickness will be provided in the fitting to develop the full strength of the pipe. A 21° taper has been found to be a satisfactory compromise since it is slim enough to permit the pipe to be readily expanded by a simple tapered plug, and has sufficient frictional grip so that it will stay in place after assembly.

It will be evident from the above description that I have produced a strong reliable joint which does not weaken the members to be jointed at the joint and therefore the full strength of these members is developed at the joint. In other words as the full strength of the members is developed at the joint it is not necessary to make the walls of these members, such as the pipe, of a greater thickness than is necessary to hold the pressure used and to compensate for corrosion. It is therefore a material improvement over the threaded pipe connection the threads of which reduce the strength of the members, and it may be termed a tapered weld in distinction from such threaded pipe connection.

Having thus set forth the nature of my invention, what I claim is:

1. A threadless pipe connection comprising a pipe of substantially uniform wall thickness having an end portion flared outwardly to provide an internal taper of an included angle in the neighborhood of approximately 21°, a fitting having an end portion within the tapered end of the pipe and externally tapered on substantially the same angle to fit the taper of the pipe, and a soldering material between said tapered surfaces and bonding the inner tapered surface of the pipe to the outer tapered surfaces of the fitting.

2. In a threadless pipe connection, a fitting having an externally tapered end portion of an included angle in the neighborhood of approximately 21°, a pipe of substantially uniform wall thickness having an end portion flared outwardly to provide an internal taper of substantially the same angle to fit the external taper of the fitting, said fitting having its tapered portion within the tapered end portion of the pipe, and a soldering material between said tapered surfaces and bonding the inner tapered surface of the pipe to the outer tapered surface of the fitting.

3. In a threadless pipe connection, a fitting having an externally tapered end portion of an included angle in the neighborhood of approximately 21°, a pipe of substantially uniform wall thickness having an end portion flared outwardly to provide an internal taper of substantially the same angle to fit and partially receive the externally tapered portion of the fitting, said fitting having its tapered portion disposed partially within the tapered end of the pipe, a soldering material between said tapered surfaces and bonding the inner tapered surface of the pipe to the received portion of the outer tapered surface of the fitting, and a soldering material covering the end of the pipe and a portion of the tapered surface of the fitting not received in the pipe.

4. A threadless pipe connection comprising a pair of pipe sections of substantially uniform wall thickness having their end portions flared outwardly to provide an internal taper, a fitting ring, said fitting ring externally tapered and inclining outwardly from its opposite ends, said pipe sections tapered at substantially the same angle as the ends of the fitting to fit the tapers of said fitting, said fitting disposed between the internally tapered ends of said pipe sections and entering into each of them, and a soldering material between the overlapping tapered surfaces of the pipe sections and fitting and bonding the inner tapered surfaces of the pipe sections to the outer tapered surfaces of the fitting, said soldering material being fusible at a lower temperature than the material of the pipes and fitting so that the pipe and fitting retain their original shape in the joint.

5. A threadless pipe connection comprising a pair of pipe sections of substantially uniform wall thickness having their end portions flared outwardly to provide them with inner tapered surfaces, a fitting ring, said fitting ring externally tapered and inclining upwardly from its oposite ends, said pipe sections tapered at substantially the same angle as the ends of the fitting to fit the tapers of said fitting, said fitting disposed between the flared ends of the pipe sections and entering into each of them, said fitting maintaining said pipe sections with their ends spaced apart, a soldering material between the overlapping tapered surfaces of the pipe sections and fitting and bonding the inner tapered surfaces of the pipe sections to the outer tapered surfaces of the fitting, and a soldering material filling the space between the ends of the pipe sections, said soldering materials being fusible at a lower temperature than the material of the pipes and fitting so that the pipes and fitting retain their original shape in the joint.

6. The method of forming a threadless pipe joint consisting in expanding the end portion of a pipe to provide the same with an inner tapered surface, providing a fitting with an outer surface tapered at substantially the same angle to fit the taper of the pipe, applying a thin walled truncated cone of bonding metal to one of said tapered surfaces, inserting the tapered portion of the fitting into the tapered portion of the pipe with the truncated cone of bonding metal between the tapered surfaces, and heating the joint to the melting point of the bond metal while pressing the pipe and fitting together.

IRA T. HOOK.